United States Patent
Condon et al.

(10) Patent No.: US 12,220,729 B2
(45) Date of Patent: Feb. 11, 2025

(54) PARTIALLY COMPRESSED CLEANING SUBSTRATE FOR MEDIA TRANSPORT DEVICE

(71) Applicant: KICTeam, Inc., Auburn, ME (US)

(72) Inventors: John Condon, Sumner, ME (US); Joshua Lee Larsen, Turner, ME (US)

(73) Assignee: KICTeam, Inc., Auburn, ME (US)

( * ) Notice: Subject to any disclaimer, the term of this patent is extended or adjusted under 35 U.S.C. 154(b) by 14 days.

(21) Appl. No.: 18/167,541

(22) Filed: Feb. 10, 2023

(65) Prior Publication Data

US 2023/0256475 A1    Aug. 17, 2023

Related U.S. Application Data (60) Provisional application No. 63/267,881, filed on Feb. 11, 2022.

(51) Int. Cl.
   *B08B 1/14*        (2024.01)
   *A47L 13/16*       (2006.01)
   (Continued)

(52) U.S. Cl.
   CPC .............. *B08B 1/143* (2024.01); *A47L 13/16* (2013.01); *B32B 5/022* (2013.01); *B32B 5/18* (2013.01); *B32B 5/245* (2013.01); *B32B 7/027* (2019.01); *B32B 27/08* (2013.01); *B32B 37/10* (2013.01); *B65G 45/10* (2013.01); *B32B 2262/0269* (2013.01); *B32B 2266/0235* (2013.01); *B32B 2266/025* (2013.01);
   (Continued)

(58) Field of Classification Search
   CPC . A47L 13/10; A47L 13/16; B08B 1/14; B08B 1/143; B32B 5/022; B32B 5/18; B32B 5/245; B32B 7/027; B32B 27/08; B32B 37/10
   See application file for complete search history.

(56) References Cited

U.S. PATENT DOCUMENTS

| | | |
|---|---|---|
| 3,142,599 A | 7/1964 | Chavannes |
| 4,900,273 A | 2/1990 | Pernet |

(Continued)

FOREIGN PATENT DOCUMENTS

| | | | |
|---|---|---|---|
| DE | 10325217 | 12/2004 | |
| DE | 202005016573 U1 * | 2/2006 | ............. A47L 13/16 |

(Continued)

OTHER PUBLICATIONS

DE 20 2005 016 573 U1; JFA Jenner; Feb. 9, 2006.*

(Continued)

*Primary Examiner* — Randall E Chin
(74) *Attorney, Agent, or Firm* — Fox Rothschild LLP (57) ABSTRACT

This document describes cleaning tools, methods of manufacturing cleaning tools, and methods of using cleaning tools, for cleaning a media transport device. The cleaning tool may include a cleaning card comprising a first core layer, as well as a first cleaning layer attached to the first core layer. The first core layer and the first cleaning layer form (a) a cleaning element having a first thickness and in which the core layer is in a relaxed state, and (b) an intermediate area that has a second thickness that is less than the first thickness and in which the core layer is in a compressed state.

20 Claims, 6 Drawing Sheets

(51) Int. Cl.
*B32B 5/02* (2006.01)
*B32B 5/18* (2006.01)
*B32B 5/24* (2006.01)
*B32B 7/027* (2019.01)
*B32B 27/08* (2006.01)
*B32B 37/10* (2006.01)
*B65G 45/10* (2006.01)

(52) U.S. Cl.
CPC ............... *B32B 2266/0278* (2013.01); *B32B 2307/5825* (2013.01); *B32B 2425/00* (2013.01); *B32B 2432/00* (2013.01)

(56) References Cited

U.S. PATENT DOCUMENTS

| | | |
|---|---|---|
| 5,153,964 A | 10/1992 | Gelardi et al. |
| 6,326,568 B2 | 12/2001 | Martucci et al. |
| 6,508,673 B2 | 1/2003 | McDowell |
| 7,540,055 B1 | 6/2009 | Bailey |
| 7,732,040 B2 | 6/2010 | Klein et al. |
| 8,323,779 B2 | 12/2012 | Bailey et al. |
| 10,189,650 B1 | 1/2019 | Bailey et al. |
| 2011/0113578 A1 | 5/2011 | Akai et al. |
| 2022/0258214 A1 | 8/2022 | Condon et al. |
| 2022/0261604 A1 | 8/2022 | Larsen et al. |

FOREIGN PATENT DOCUMENTS

| | | |
|---|---|---|
| DE | 102007016949 | 10/2007 |
| EP | 0711438 | 7/2004 |
| WO | 1994009488 | 4/1994 |
| WO | 2007118454 | 10/2007 |

OTHER PUBLICATIONS

International Search Report and Written Opinion for International PCT Patent Application No. PCT/US23/62385 mailed May 16, 2023 (14 pages).

\* cited by examiner

PARTIALLY COMPRESSED CLEANING SUBSTRATE FOR MEDIA TRANSPORT DEVICE

RELATED APPLICATIONS AND CLAIM OF PRIORITY

This patent document claims priority to U.S. Provisional Patent Application No. 63/267,881, filed Feb. 11, 2022, the disclosure of which is fully incorporated into this document by reference.

BACKGROUND

Many machines have media transport mechanisms that receive printed media into the machine and move the media through one or more sections of the machine to perform various processes on the media. For example, a financial transaction terminal such as an automated teller machine may do any or all of the following steps: (i) receive printed currency notes, checks, receipts, coupons, tickets and other printed media; (ii) align the media to an internal reference; (iii) use a camera and/or other sensors to detect what the media is and/or what is printed on the media; (iv) apply additional printed markings to the media; and/or (v) move the media to an appropriate shuttle, bin or exit port. The terminal may perform some or all of these steps, and/or additional steps. Other machines that include media transport mechanisms include coupon printers, ticket printers, ticket-taking devices and other printed media handling systems.

Figure 1:
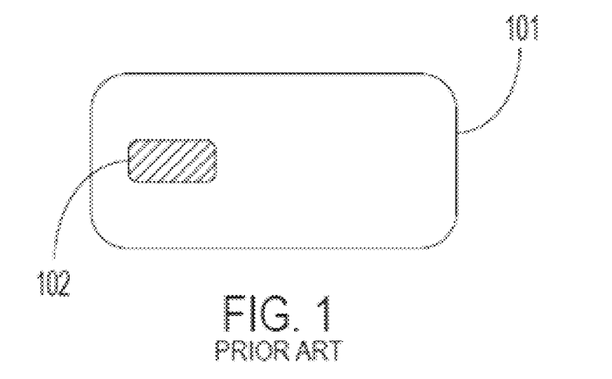
FIG. 1 illustrates components of an example chip transaction card as one exists in the prior art.

Transaction cards such as credit cards and debit cards, are often used by customers to pay for transactions at a point of sale (POS). For example, as shown in FIG. 1, many such cards 101 include an integrated circuit, generally known as an "EMV chip", "Europay/Mastercard/Visa chip" or simply a "chip" 102, that stores data that the card reader uses to authenticate, authorize and process transactions.

Figure 2A:
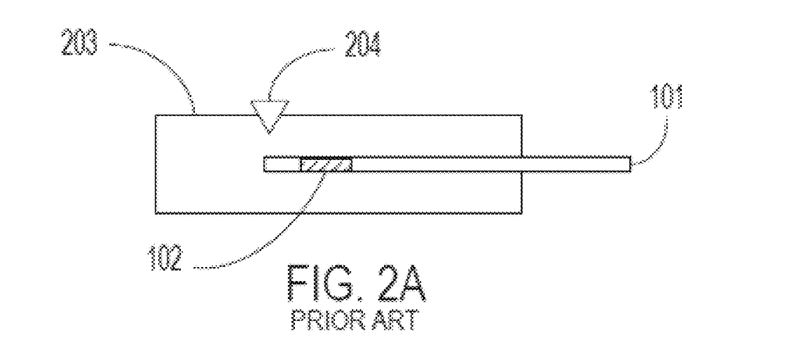
FIGS. 2A-2B illustrate certain elements of a chip card reading device such as is available in the prior art.
Figure 2B:
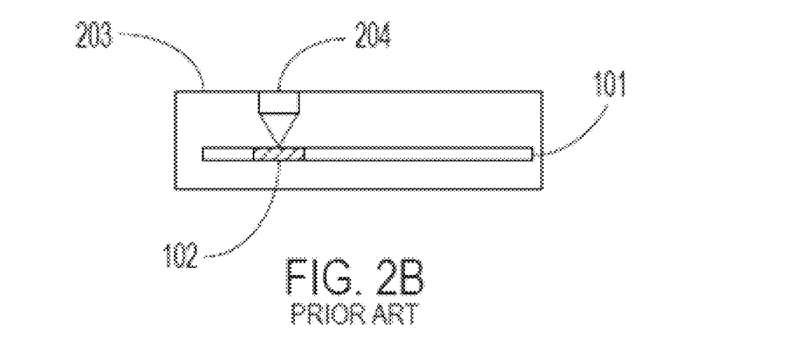

To read an EMV chip card, as illustrated in FIGS. 2A-2B, a card reading device includes a housing 203 with a slot that receives the card into the reading device. A sensor inside of the slot detects when the card 101 reaches a reading position inside of the slot. When the card 101 reaches the reading position, a reading head is positioned over or under the area of the card that includes the chip 102. The reading head includes electrical contacts 204 that will move toward the card and interface with the chip 102 to read data from the chip 102. Examples of such card readers are disclosed in, for example, U.S. Pat. Nos. 4,900,273, 6,326,568, and 6,508,673, as well as European Patent Application No. EP0711438, the disclosures of which are fully incorporated into this document by reference.

Other types of card reading devices include that which is known as a "dip reader", into which a chip card is inserted and quickly retracted from the device, so that the card is only partially and not fully inserted into the device. As a card is inserted into this type of device, it comes in contact with a lever.

Because transaction cards can be handled by human hands and can be exposed to various environmental conditions, the insertion of a card into a card reading device also introduces dirt, oil and/or other contaminants into the card reader slot. When such contaminants touch the reading device's contacts and other components of the reading head, it can impair the device's ability to collect data from the card. Over time, the contaminants can build up on the contacts and other components, and they may cause the reader to malfunction.

Cleaning devices for media transport devices like chip card readers are known. For example, German patent application publication number DE10325217 discloses a card-shaped carrier material with a fiber flock material or a specifically contoured material for cleaning the chips of the card reading device. However, such cleaning cards can be difficult to manufacture, and often must be moved within the device in order to affect a cleaning operation.

This document describes methods and systems directed to solving some of the issues described above, and/or other issues

SUMMARY

This document describes cleaning tools, methods of manufacturing cleaning tools, and methods of using cleaning tools, for cleaning a media transport device. The cleaning tool may include a cleaning card comprising a first core layer, as well as a first cleaning layer attached to the first core layer. The first core layer and the first cleaning layer form (a) a cleaning element having a first thickness and in which the core layer is in a relaxed state, and (b) an intermediate area that has a second thickness that is less than the first thickness and in which the core layer is in a compressed state.

In some embodiments, the cleaning element may be surrounded by the intermediate area.

In any of the embodiments described above, the first core layer may comprise foam.

In any of the embodiments described above, the first core layer may have a first melting temperature, and the first cleaning layer may have a second melting temperature that is greater than the first melting temperature.

As a further option, the card may further comprise a support layer having a third melting temperature and which is attached to the first core layer, and the third melting temperature may be greater than the first melting temperature. Optionally, the support layer may comprise a rigid plastic.

As a further option, the tool may further comprise a second core layer attached to the support layer and having a fourth melting temperature that is substantially the same as the first melting temperature. The tool also may comprise a second cleaning layer attached to the second core layer and having a fifth melting temperature that is substantially the same as the second melting temperature.

In any of the embodiments described above, the cleaning tool may further comprise a cavity positioned within the cleaning element under the first cleaning layer.

In a second aspect, a method of manufacturing a cleaning tool comprises: (i) contacting a first core layer to a first cleaning layer, wherein the cleaning card comprises a cleaning area and an intermediate area; and (ii) compressing the intermediate area by applying pressure to the intermediate area such that the intermediate area is compressed to a first thickness, while not compressing the cleaning area and allowing the cleaning area to remain at a second thickness is greater than the first thickness.

Optionally, in the method above the first core layer may have a first melting temperature, the first cleaning layer may have a second melting temperature, and the method may further include, while compressing the intermediate area, heating the intermediate area to a compression temperature that is less than the first melting temperature and greater than the second melting temperature. Optionally, before applying the pressure, the method may include contacting a support layer laminated to the first core layer, wherein the support layer has a third melting temperature that greater than both the first melting temperature and the compression temperature. Also optionally, before applying the heat and the pressure, the method may include contacting a second core layer to the support layer, wherein the second core layer has a fourth melting temperature that is substantially the same as the first melting temperature. Also optionally, before applying the heat and the pressure, the method may include contacting a second cleaning layer to the second core layer, wherein the second cleaning layer has a fifth melting temperature that is substantially the same as the second melting temperature.

In any of the method embodiments described above, contacting the first core layer to the first cleaning layer optionally may comprise laminating the first core layer to the first cleaning layer.

In any of the method embodiments described above, before applying the pressure, the method may include positioning a cavity in the cleaning area under the first cleaning layer.

In a third aspect, a method of cleaning a media transport device includes inserting a cleaning tool into the media transport device. The cleaning tool comprises a core layer and a cleaning layer attached to the core layer. The core layer and the cleaning layer form (a) a cleaning element having a first thickness and in which the core layer is in a relaxed state, and (b) an intermediate area which has a second thickness that is less than the first thickness and in which the core layer is in a compressed state. The cleaning element comes in contact with at least one component of the media transport device when the tool is inserted into the media transport device.

Optionally, in the third aspect above, the cleaning element may be surrounded by the intermediate area. Also, the core layer may have a first melting temperature, and the first cleaning layer may have a second melting temperature that is greater than the first melting temperature.

DETAILED DESCRIPTION

In this document, the singular forms "a," "an," and "the" include plural references unless the context clearly dictates otherwise. The term "comprising" means "including, but not limited to." Similarly, the term "comprises" means "includes, and is not limited to." Unless defined otherwise, all technical and scientific terms used in this document have the same meanings as commonly understood by one of ordinary skill in the art.

In this document, terms that are descriptive of relative position such as "upper" and "lower", "top" and "bottom", "horizontal" and "vertical" and the like are intended to indicate relative positions with respect to the components for which those terms are descriptive, and are not intended to be absolute and require that the component remain in that absolute position in all configurations.

Except where specifically stated otherwise, numeric descriptors such as "first", "second", etc. are not intended to designate a particular order, sequence or position in an overall process or schema, but instead are simply intended to distinguish various items from each other by describing them as a first item, a second item, etc.

The terms "substantially" and "approximately", when used in reference to a value, means a range that is within +/−10% of the value. When used in reference to a feature of an object, such as a substantially planar surface, terms such as "substantially" and "approximately" mean that the primary portion of the object exhibits the feature, although other portions may deviate. For example, a cleaning card in the form of a card from which embossments extend is considered to be a substantially planar surface.

The terms "media transport system" and "media transport device" refer to a set of hardware components that are configured to receive printed media (i.e., a substrate onto which text and/or graphics have been printed) or digitally encoded media (such as a chip in a credit card) and move the printed media through one or more modules that perform various processing steps on the printed media, such as position adjustment, sensing, printing and/or delivery to a final destination. Thus, a card reading device as described in the Background section in this application is a type of media transport device. A "currency transport device" or "currency transport system" is a type of media transport device that is configured to process and convey printed financial instruments such as, currency notes, checks, money orders, bank notes and the like, and digital financial instruments such as credit cards. A "currency transport device" or "currency transport system" is a type of media transport device that is configured to process and convey printed financial instruments such as currency notes, checks, money orders, bank notes and the like, and digital financial instruments such as credit cards.

Figure 3:
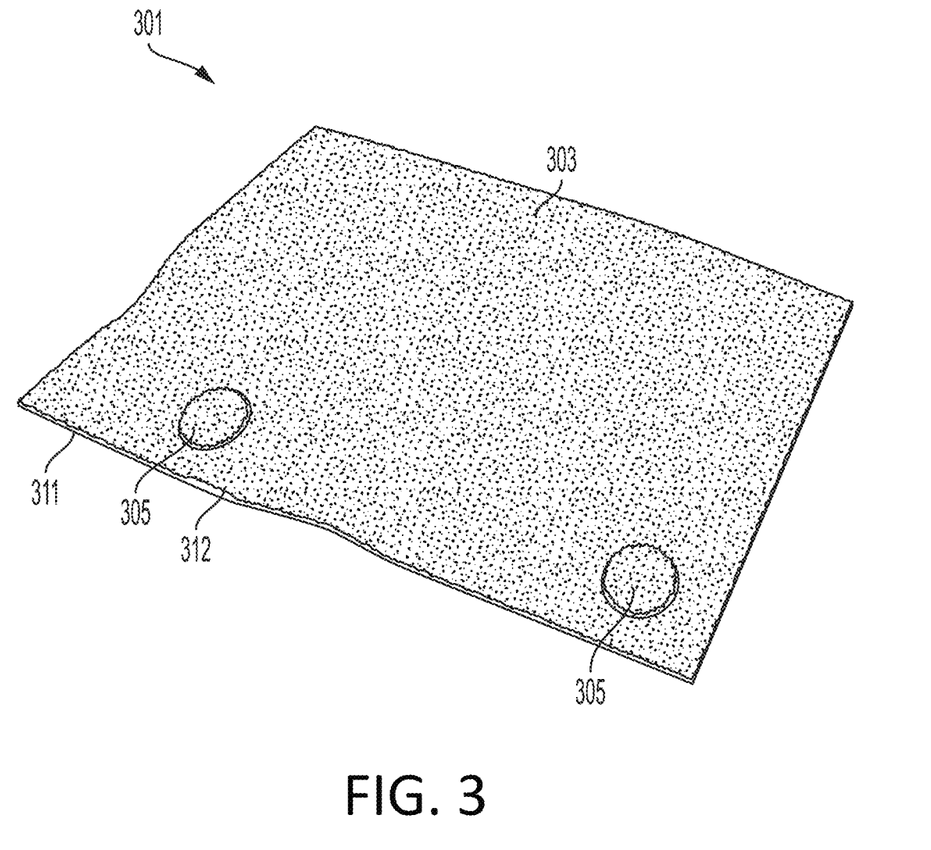
FIG. 3 illustrates an example of a cleaning tool.

FIGS. 3-7 illustrate an example of a cleaning tool 301 for media transport devices, such as a chip card reader. FIG. 3 shows the cleaning tool 301 from a top-front-right perspective. The cleaning tool is formed of a card having a planar substrate with certain features described below.

The cleaning tool includes a card with a first cleaning surface 303 (shown as the top layer in FIGS. 3-7) and a lower support layer 311. The support layer 311 may be made of a flexible, tear-resistant fibrous material such as a fibrous aramid or meta-aramid fabric material such as that marketed under the NOMEX® brand; a cellulosic material; or a flexible polymeric substrate provided with thin, non-woven layers made of absorbent material such as that marketed under the SONTARA® brand. The material of the support layer 311 may provide a cleaning function as the material may contact and wipe across various components of the media transport device as the cleaning tool moves into and out of the device. The first cleaning surface 303 may be the edge of a first core layer 312. Alternatively, the cleaning tool may have a distinct first core layer 312. The first core layer 312 may be made of any material that is flexible and tear-resistant. For example, the first core layer 312 may be made of polyvinyl chloride, polypropylene, polyurethane foam, or any similar material. The first core layer 312 may be laminated onto or otherwise contacted to the support layer 311. The first cleaning surface 303 may be made of a soft fabric or other soft material such as unbroken loop (UBL) fabric that is attached to the core layer 312. Other materials may include flocked material or other patterned or textured surfaces that provide a cleaning friction. The support layer 311 may be attached to the core layer 312 opposite the first cleaning surface 303. In certain embodiments, the support layer 311 may be omitted.

Figure 6:
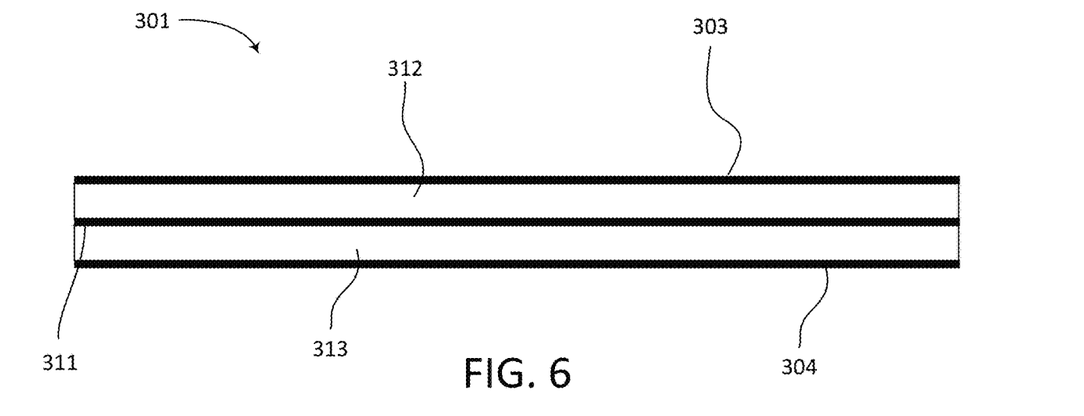
FIG. 6 shows a side view of an example of layers of a cleaning tool in an uncompressed state, before cleaning elements are formed.
Figure 7:
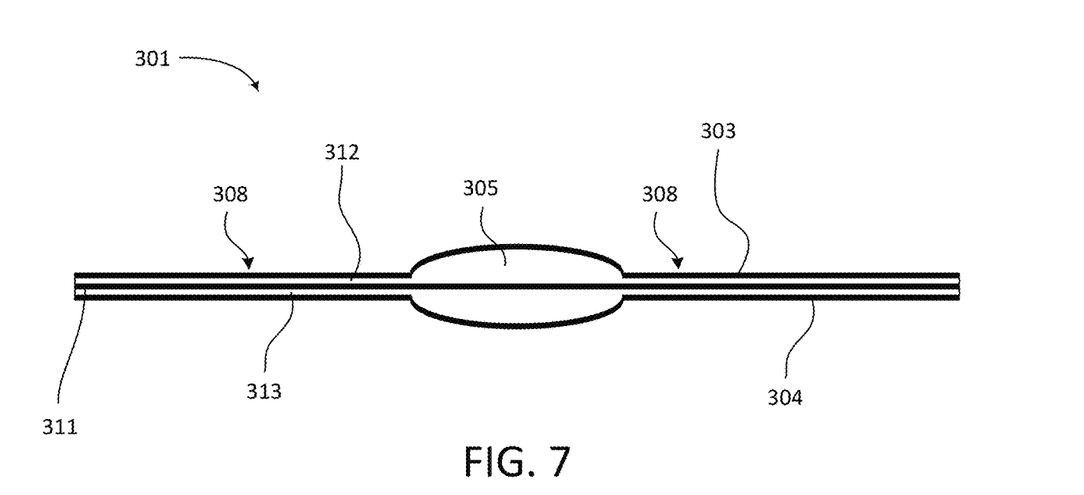
FIG. 7 shows a side view of the layers of FIG. 6 after cleaning elements have been formed in opposing sides of the cleaning tool by compression.

As shown in FIGS. 6-7, the cleaning tool 301 may include a second core layer 313. The second core layer 313 may be formed of the same material as the first core layer 312. Alternatively, the first core layer 312 and the second core layer 313 may be formed of different materials. The second core layer 313 may contact the support layer 311. The second core layer 313 may contact the support layer 311 at a side opposite the side that contacts the first core layer 312.

Optionally, the cleaning tool also may include a second cleaning surface 304. The second cleaning surface 304 may be formed of the same materials as the first cleaning surface 303. The second cleaning surface 304 may be formed of a fabric or another texture that provides a cleaning friction. The second cleaning surface 304 may be attached to the support layer 311. Alternatively, the support layer 311 may be omitted, and the second cleaning surface 304 may be directly or indirectly attached to the core layer 312. The first cleaning surface 303 may be directly or indirectly attached to a first side of the core layer 312, and the second cleaning surface 304 may be directly or indirectly attached to a second side of a core layer 312.

In certain embodiments the cleaning tool may have layers of varying stiffness. For example, the support layer 311 may be more rigid than the core layer 312. In addition, the first cleaning surface 303, when made of a material that differs from the core layer 312, may be more rigid than the core layer 312.

When the cleaning tool 301 is in its uncompressed state, the layers of the cleaning tool may have the same thickness or differing thicknesses. For example, the first core layer 312 and/or the second core layer 313 may have a thickness that is greater than the support layer 311. The first core layer 303 and/or the second core layer 304 may also have a thickness that is greater than the first cleaning surface 303 and/or the second cleaning surface 304, support layer 311. The support layer may be thicker than the first cleaning surface. Alternatively, the first cleaning surface may be thicker than the support layer. For example, the support layer 311 may have a thickness of 0.01 to 0.23 inches. The core layer 312 may have a thickness of 0.01 to 0.04 inches. In some embodiments, the overall thickness of the uncompressed cleaning tool may be from 0.010 to 0.240 inches, and when compressed the cleaning tool thickness may be not less than 0.010 inches. Other thicknesses are possible.

In certain embodiments the cleaning tool may have layers of the same compressibility or of varying compressibility. For example, the first core layer 312 and the second core layer 313 may be more compressible than the support layer 311. The first core layer 312 and the second core layer 313 may also be more compressible than the first cleaning surface 303 and/or the second cleaning surface 304. The support layer 311 may be more compressible than the core layer 312.

In certain embodiments, the cleaning tool may have layers having the same melting temperature or varying melting temperatures. The melting temperature is the temperature at which a layer begins to melt. In certain embodiments, the melting temperature of the first cleaning surface 303 may have a melting temperature that is greater than the melting temperature of the first core layer 312. The support layer 311 may have a melting temperature that is greater than the melting temperature of the first core layer 312. The second core layer 313 may have a melting temperature that is substantially equal to the melting temperature of the first core layer 312. The second cleaning surface 304 may have a melting temperature that is substantially equal to the melting temperature of the first cleaning surface 303. In embodiments, the melting temperatures of all the layers may be substantially the same.

In embodiments a first cleaning surface 303 may have a first melting temperature. The first core layer 312 may have a second melting temperature. The support layer 311 may have a third melting temperature. The second core layer 313 may have a fourth melting temperature. The second cleaning surface 304 may have a fifth melting temperature. The fourth melting temperature may be equal to the second melting temperature. The fifth melting temperature may be equal to the first melting temperature.

Figure 4:
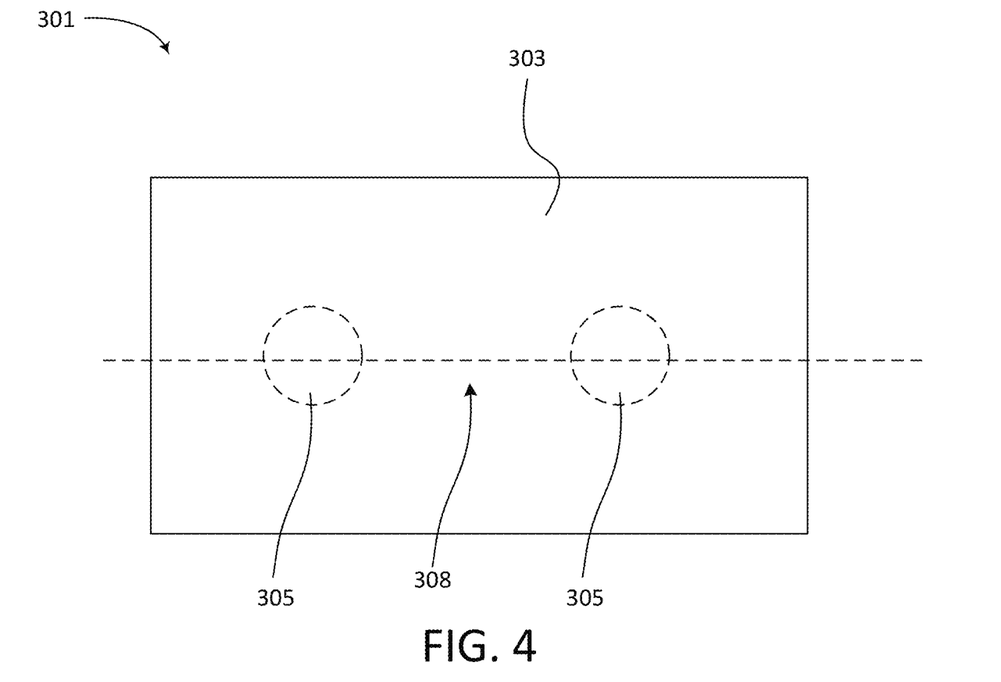
FIG. 4 shows a top view of an example of a cleaning tool.
Figure 5:
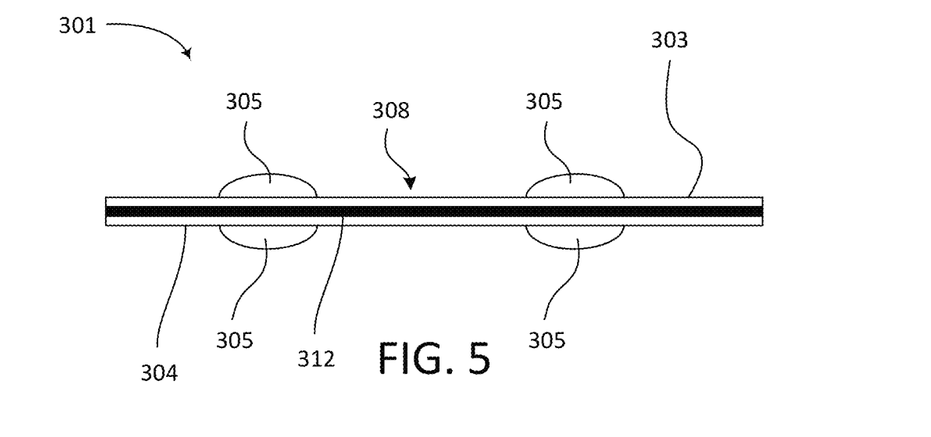
FIG. 5 shows a side view of an example of a cleaning tool.

As illustrated in FIGS. 3-5, the cleaning tool 301 may have a cleaning element 305. A cleaning element 305 may include portions of the cleaning tool 301 that may come in contact with an element of a media transport device. The cleaning tool 301 may also have an intermediate portion 308. An intermediate portion 308 may include portions of the cleaning tool 301 where there are no cleaning elements 305. A cleaning element 305 will generally have a thickness that is greater than the thickness of the intermediate portion 308. The intermediate portion 308 may include portions of the cleaning tool 301 that are in their compressed state. A cleaning element 305 may include portions of the cleaning tool 301 that are in their relaxed state. In various embodiments, the intermediate portion 308 may be more compressed than a cleaning element 305. In embodiments, a cleaning element 305 may be uncompressed.

Figure 9:
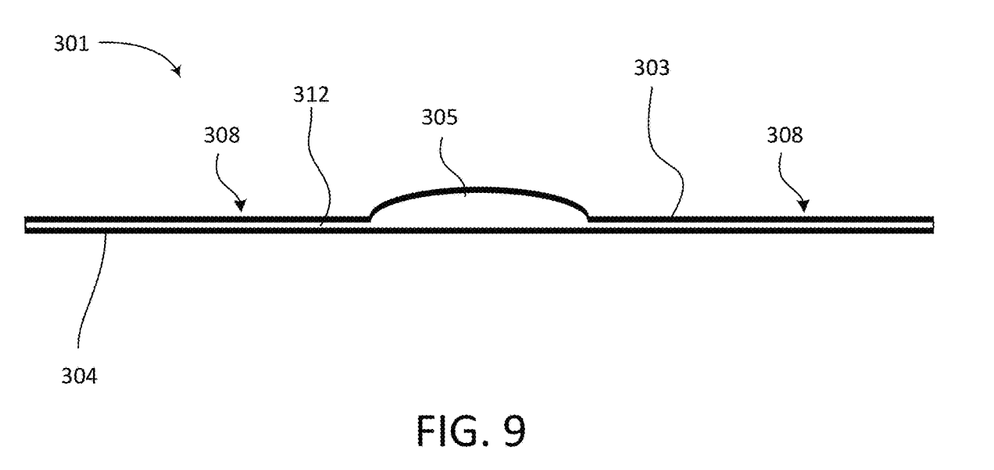
FIG. 9 shows a side view of the layers of FIG. 6 after a cleaning element has been formed in one side of the tool by compression.

As illustrated in FIG. 7, an intermediate portion 308 may be compressed from both sides of the cleaning tool. In such embodiments, a cleaning element 305 may appear as a portion of the card that is raised in both directions with respect to the plane of the card. Alternatively, as illustrated in FIG. 9, an intermediate portion 308 may be compressed from one side. In such embodiments, a cleaning element 305 may appear as a portion of the card that is raised in one direction with respect to the plane of the card.

Figure 8:
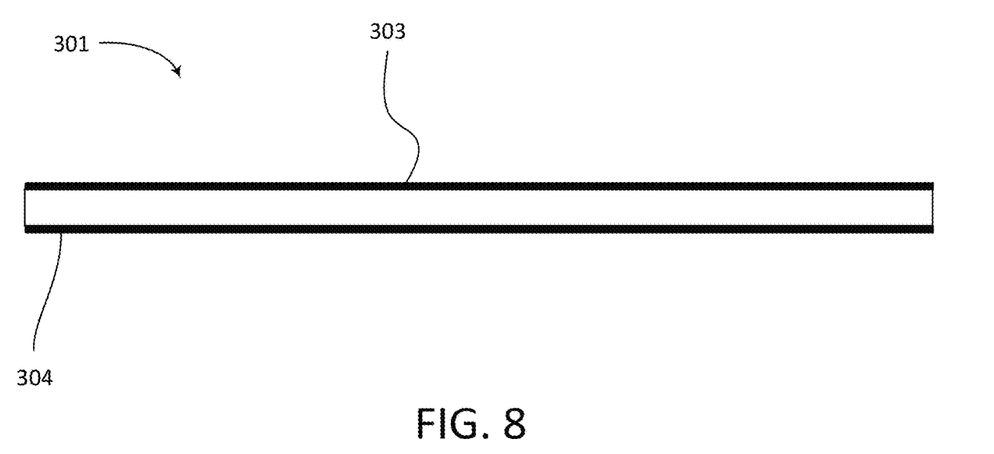
FIG. 8 shows a side view of another example of layers of a cleaning device in an uncompressed state, before cleaning elements are formed.

The cleaning tool 301 may be manufactured by first forming an uncompressed cleaning tool (illustrated by FIGS. 6 and 8). An uncompressed cleaning tool may be formed by contacting a first core layer 312 with a first cleaning surface 303. A support layer 311 may then be contacted to the first core layer 312 at a side opposite the first cleaning surface 303. Alternatively (as illustrated in FIG. 8), a second cleaning surface 304 may be contacted to the first core layer 312 at a side opposite the first cleaning surface 303. In embodiments (as illustrated in FIG. 6), a second core layer 313 may contact the support layer 311 at a side opposite the first core layer 312. A second cleaning surface 304 may contact the second core layer 313 at a side opposite the support layer 311. Any of the layers may be omitted or substituted with a different layer or material. In embodiments, the layers may be laminated to each other.

An uncompressed cleaning tool may be compressed to form a compressed cleaning tool 301. As illustrated in FIGS. 6-7 the uncompressed cleaning tool (FIG. 6), may be compressed from both sides to form a compressed cleaning tool (FIG. 7). To form such a compressed cleaning tool, pressure may be applied from both sides at an intermediate portion 308. In such embodiments, an intermediate portion becomes compressed, and a cleaning element 305 remains uncompressed. In other embodiments, as illustrated in FIGS. 8-9, the uncompressed cleaning tool (FIG. 8) may be compressed from one side to form a compressed cleaning tool (FIG. 9). To form such a compressed cleaning tool, pressure may be applied from one side at an intermediate portion 308. In such embodiments, an intermediate portion becomes compressed, and a cleaning element 305 remains uncompressed.

In embodiments, in addition to applying pressure, heat may also be applied to form the compressed cleaning tool. Heat may be applied such that the temperature of the card reaches a compression temperature, at which one or more layers of the card begin to melt. For example, heat may be applied such that the first core layer 312 begins to melt, but a first cleaning surface 303 does not melt. The heat may be applied such that the compression temperature is less than the first temperature, and greater than the second melting temperature. The compression temperature may be less than the third temperature.

Optionally, in some embodiments, instead of a cleaning element being solid inside or containing a single material under the cleaning layer, one or more of the cleaning elements may contain a cavity that is positioned under the cleaning layer and within or under the core layer. The cavity may be formed of a housing that holds air or another material that differs from the core layer material. Alternatively, the cavity may form during the compression process as a section of the cleaning layer separates from the core layer, or as a portion of the core layer separates from the support layer.

Figure 10:
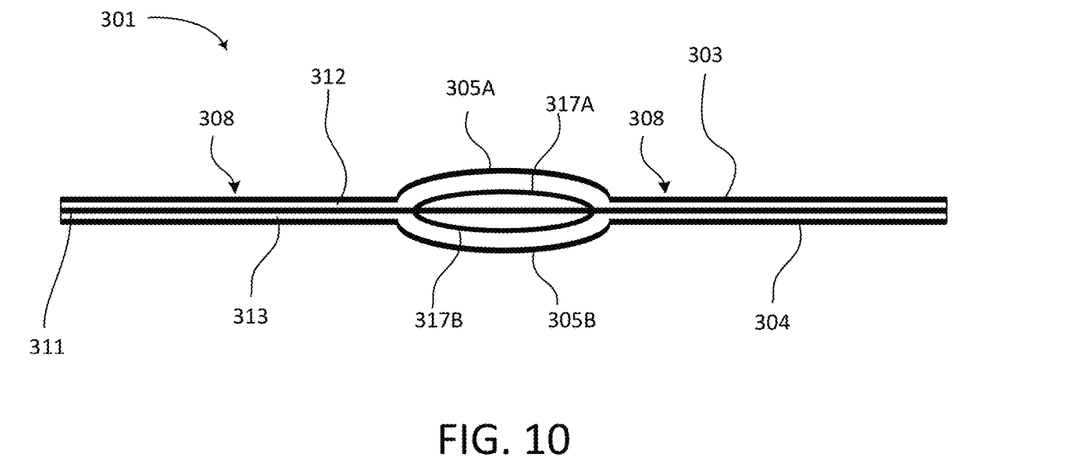
FIG. 10 shows the embodiment of FIGS. 6 and 7 in a compressed state with an additional, optional air cavity.

This is illustrated by way of example in FIG. 10, which illustrates the embodiment of FIG. 7 in which a first cavity 317A is positioned within a first cleaning element 305A and which a second cavity 317B is positioned within a second cleaning element 305B. The first cavity 317B and second cavity 317B may be adjacent to each other and segments of a single cavity. Alternatively, they may be two separate cavities separated by the support layer 311 as shown, and optionally by portions of either or both of the core layers 312, 313. The cavities may be formed of a housing positioned in their respective core layers. Alternatively, the cavities 317A, 317B may be formed by partial separation of the core layers 312, 313 from the support layer 311 in the area of the cleaning structures 305A, 305B.

Figure 11A:
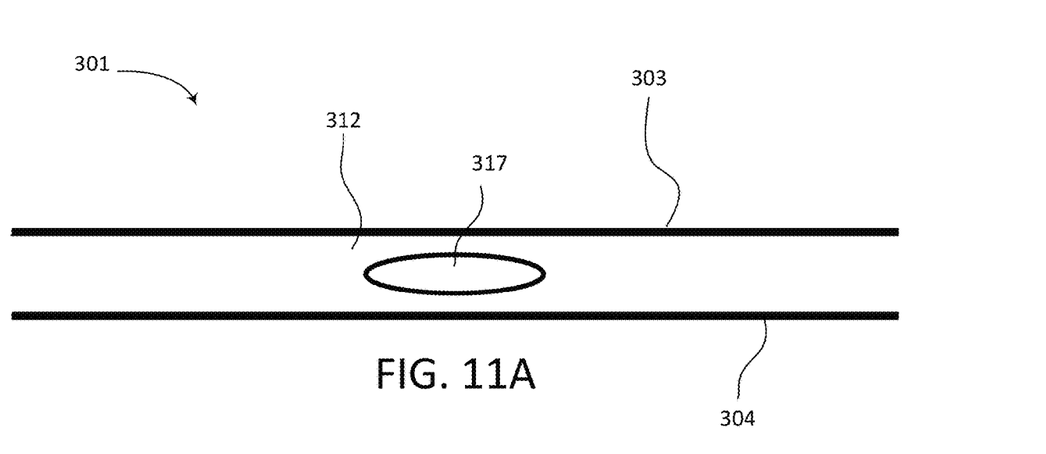
FIGS. 11A and 11B show the embodiment of FIGS. 8 and 9 with the additional, optional air cavity.
Figure 11B:
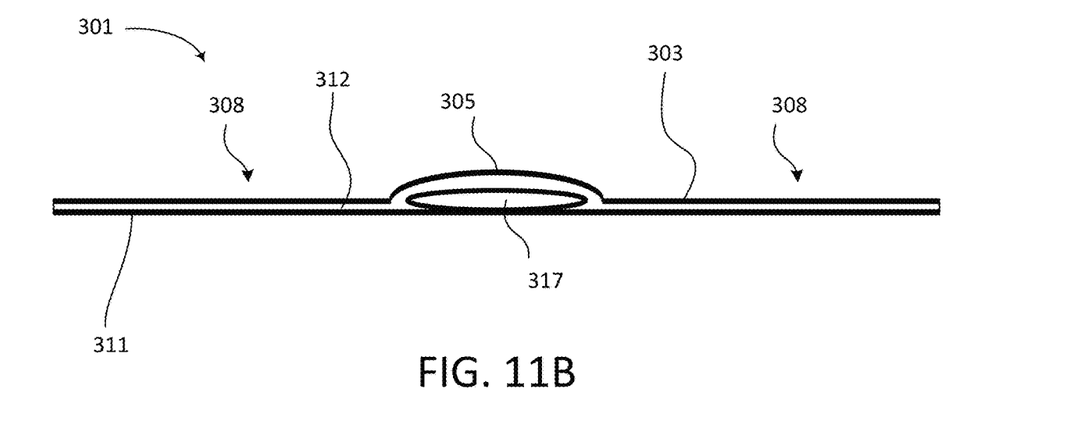

Another example is illustrated in FIGS. 11A and 11B, which show the embodiment of FIGS. 8 and 9 with a portion of the layer positioned directly under cleaning element 305 including a cavity 317 that contains air or another material that differs from the material of the first core layer 313 and (in embodiments that include it) the second core layer 313. The cavity 317 may form on its own as a result of the compression process, especially if the core layer 312 is not adhered to the support layer 311, Alternatively, as shown in FIG. 11A, a housing for a cavity 317 may be positioned within the core layer 312 before the device is compressed, and as shown in FIG. 11B the cavity 317 will help form the cleaning element 305 when the intermediate areas 308 around the cleaning element 305 are compressed.

The compressed cleaning tool 301 may be used for cleaning a media transport device. The cleaning tool 301 may be inserted into a media transport device such that a cleaning element 305 comes in contact with an element of the media transport device.

The cleaning tool of this disclosure can be manufactured by compressing the intermediate segments of the tool into a compressed, substantially planar card. Specifically, the cleaning elements 305 may be formed into the card by an embossing process in which the intermediate portion 308 is compressed by applying heat, pressure or both heat and pressure to press the intermediate portion 308 of the card into the desired shape. For example, a die with openings corresponding to desired locations of the cleaning elements may be positioned against the intermediate portion 308 of the card between, and pressure may be applied to the die, optionally while heat is applied to the intermediate area 308 and/or the die. By way of example, approximately 20 tons of pressure may be applied with a press, with pressure applied less than one second under a temperature ranging 190-260 degrees Fahrenheit, such as approximately 210, 220, 225, 230, 235 or 240 degrees. The raised cleaning elements 305 are then formed as relief areas that are in a relaxed (uncompressed) state that extend outward from the compressed, planar intermediate portion 308 of the card. The application of heat and/or pressure alters the structure of the planar card so that the intermediate portion 308 will remain compressed when the heat and pressure are removed.

The methods and systems described above may result in significant time savings as compared to manual cleaning. In addition, they can help ensure that cleaning occurs in small and/or hard-to-reach segments within the media transport device.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A cleaning tool for cleaning a media transport device comprising:
   a cleaning card comprising:
      a first core layer, and
      a first cleaning layer attached to the first core layer,
   wherein the first core layer and the first cleaning layer form:
      a cleaning element having a first thickness and in which the first core layer is in a relaxed state, and
      an intermediate area that has a second thickness that is less than the first thickness and in which the first core layer is in a compressed state.

2. The cleaning tool of claim 1, wherein the cleaning element is surrounded by the intermediate area.

3. The cleaning tool of claim 1, wherein the first core layer comprises foam.

4. The cleaning tool of claim 1, wherein:
   the first core layer has a first melting temperature; and
   the first cleaning layer has a second melting temperature that is greater than the first melting temperature.

5. The cleaning tool of claim 4, further comprising a support layer having a third melting temperature and which is attached to the first core layer, wherein the third melting temperature is greater than the first melting temperature.

6. The cleaning tool of claim 5, wherein the support layer comprises a rigid plastic.

7. The cleaning tool of claim 5, further comprising a second core layer attached to the support layer and having a fourth melting temperature that is substantially the same as the first melting temperature.

8. The cleaning tool of claim 7, further comprising a second cleaning layer attached to the second core layer and having a fifth melting temperature that is substantially the same as the second melting temperature.

9. The cleaning tool of claim 1, further comprising a cavity positioned within the cleaning element under the first cleaning layer.

10. A method of manufacturing a cleaning tool comprising:
    contacting a first core layer to a first cleaning layer, wherein the first cleaning layer comprises a cleaning area and an intermediate area;
    positioning a cavity in the cleaning area under the first cleaning layer; and
    after positioning the cavity in the cleaning area, compressing the intermediate area by applying pressure to the intermediate area such that the intermediate area is compressed to a first thickness, while not compressing the cleaning area and allowing the cleaning area to remain at a second thickness is greater than the first thickness.

11. The method of claim 10, wherein:
    the first core layer has a first melting temperature;
    the first cleaning layer has a second melting temperature; and
    the method further comprises, while compressing the intermediate area, heating the intermediate area to a compression temperature that is less than the first melting temperature and greater than the second melting temperature.

12. The method of claim 11 further comprising, before applying the pressure, contacting a support layer laminated to the first core layer,
    wherein the support layer has a third melting temperature that greater than both the first melting temperature and the compression temperature.

13. The method of claim 12 further comprising, before applying the pressure, contacting a second core layer to the support layer,
    wherein the second core layer has a fourth melting temperature that is substantially the same as the first melting temperature.

14. The method of claim 13 further comprising:
    before applying the pressure, contacting a second cleaning layer to the second core layer,
    wherein the second cleaning layer has a fifth melting temperature that is substantially the same as the second melting temperature.

15. The method of claim 10 wherein contacting the first core layer to the first cleaning layer comprises laminating the first core layer to the first cleaning layer.

16. A method of manufacturing a cleaning tool comprising:
    contacting a first core layer to a first cleaning layer, wherein the first cleaning layer comprises a cleaning area and an intermediate area; and
    compressing the intermediate area by applying pressure to the intermediate area such that the intermediate area is compressed to a first thickness, while not compressing the cleaning area and allowing the cleaning area to remain at a second thickness is greater than the first thickness,
    wherein:
        the first core layer has a first melting temperature,
        the first cleaning layer has a second melting temperature, and
        the method further comprises, while compressing the intermediate area, heating the intermediate area to a compression temperature that is less than the first melting temperature and greater than the second melting temperature.

17. The method of claim 16 further comprising, before applying the pressure, contacting a support layer laminated to the first core layer,
    wherein the support layer has a third melting temperature that greater than both the first melting temperature and the compression temperature.

18. The method of claim 17 further comprising, before applying the pressure, contacting a second core layer to the support layer,
    wherein the second core layer has a fourth melting temperature that is substantially the same as the first melting temperature.

19. The method of claim 18 further comprising:
    before applying the pressure, contacting a second cleaning layer to the second core layer,
    wherein the second cleaning layer has a fifth melting temperature that is substantially the same as the second melting temperature.

20. The method of claim 16 wherein contacting the first core layer to the first cleaning layer comprises laminating the first core layer to the first cleaning layer.

* * * * *